United States Patent
Bedrax-Weiss et al.

(10) Patent No.: US 9,483,460 B2
(45) Date of Patent: Nov. 1, 2016

(54) AUTOMATED FORMATION OF SPECIALIZED DICTIONARIES

(71) Applicant: Google Inc., Mountain View, CA (US)

(72) Inventors: Tania Bedrax-Weiss, Sunnyvale, CA (US); Geza Kovacs, Mountain View, CA (US); Ulas Kirazci, Mountain View, CA (US)

(73) Assignee: Google Inc., Mountain View, CA (US)

( * ) Notice: Subject to any disclaimer, the term of this patent is extended or adjusted under 35 U.S.C. 154(b) by 88 days.

(21) Appl. No.: 14/047,502

(22) Filed: Oct. 7, 2013

(65) Prior Publication Data
US 2015/0100308 A1    Apr. 9, 2015

(51) Int. Cl.
*G06F 17/27* (2006.01)

(52) U.S. Cl.
CPC ......... *G06F 17/2735* (2013.01); *G06F 17/277* (2013.01); *G06F 17/2795* (2013.01)

(58) Field of Classification Search
CPC .......... G06F 17/2735; G06F 17/2795; G06F 17/277
USPC ............................... 704/4, 7, 9, 10
See application file for complete search history.

(56) References Cited

U.S. PATENT DOCUMENTS

2011/0191098 A1*  8/2011  Thomas et al. ................... 704/9
2013/0007607 A1*  1/2013  Caldwell ............. G06F 17/2276
                                                                  715/259

* cited by examiner

*Primary Examiner* — Thierry L Pham
(74) *Attorney, Agent, or Firm* — Fenwick & West LLP (57) ABSTRACT

A document analysis system analyzes a corpus of documents and automatically generates a dictionary of specialized phrases not already in conventional dictionaries. The dictionary generation process involves a series of operations on the phrases to identify the phrases most suitable for inclusion in a dictionary, such as phrase scoring and phrase clustering. The dictionary generation process also comprises the identification of one or more corresponding definitions for the various phrases identified for inclusion in the specialized dictionary.

20 Claims, 4 Drawing Sheets

AUTOMATED FORMATION OF SPECIALIZED DICTIONARIES

BACKGROUND

1. Field of the Art

The present invention generally relates to the field of electronic data analysis, and more specifically, to the formation of specialized dictionaries for a given document corpus of electronic documents.

2. Description of the Related Art

A number of organizations manually create dictionaries of conventional words or phrases considered to be standard for the languages in which the dictionaries are written. However, such conventional dictionaries often do not include a number of specialized phrases of interest in particular contexts, such as fictional phrases (e.g., names and terms defined in a series of books of fiction, e.g., the term "Quidditch"), terminology specific to particular contexts such as nautical or legal terms, or other types of domain-specific phrases. Although certain fragmented and non-comprehensive attempts may have been created through manual efforts, these techniques are not suitable for all domains.

BRIEF SUMMARY

In one embodiment, a computer-implemented method for automatically generating a specialized dictionary, comprises extracting potential phrases from a document corpus, clustering ones of the potential phrases into a plurality of phrase clusters, selecting a plurality of the potential phrases in the phrase clusters as dictionary phrases, each selected dictionary phrase being representative of one of the phrase clusters, extracting one or more definitions for the selected dictionary phrases, and storing the selected dictionary phrases in corresponding association with the one or more definitions.

In one embodiment, a computer-readable storage medium storing instructions executable by a processor, the instructions comprising instructions for extracting potential phrases from a document corpus, instructions for clustering ones of the potential phrases into a plurality of phrase clusters, instructions for selecting a plurality of the potential phrases in the phrase clusters as dictionary phrases, each selected dictionary phrase being representative of one of the phrase clusters, instructions for extracting one or more definitions for the selected dictionary phrases, and instructions for storing the selected dictionary phrases in corresponding association with the one or more definitions.

In one embodiment, a computing device comprises a computer processor, and instructions executable by the computing device for displaying a definition of a phrase on the computing device, wherein the definition is determined by a server performing steps comprising extracting potential phrases from a document corpus, clustering ones of the potential phrases into a plurality of phrase clusters, selecting a plurality of the potential phrases in the phrase clusters as dictionary phrases, each selected dictionary phrase being representative of one of the phrase clusters, extracting one or more definitions for the selected dictionary phrases, and storing the selected dictionary phrases in corresponding association with the one or more definitions.

In one embodiment, a system comprises means for extracting a plurality of potential phrases from a document corpus, means for clustering ones of the potential phrases into a plurality of phrase clusters, means for selecting a plurality of the potential phrases in the phrase clusters as dictionary phrases, each selected dictionary phrase being representative of one of the phrase clusters, means for extracting one or more definitions for the selected dictionary phrases, and means for storing the selected dictionary phrases in corresponding association with the one or more definitions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
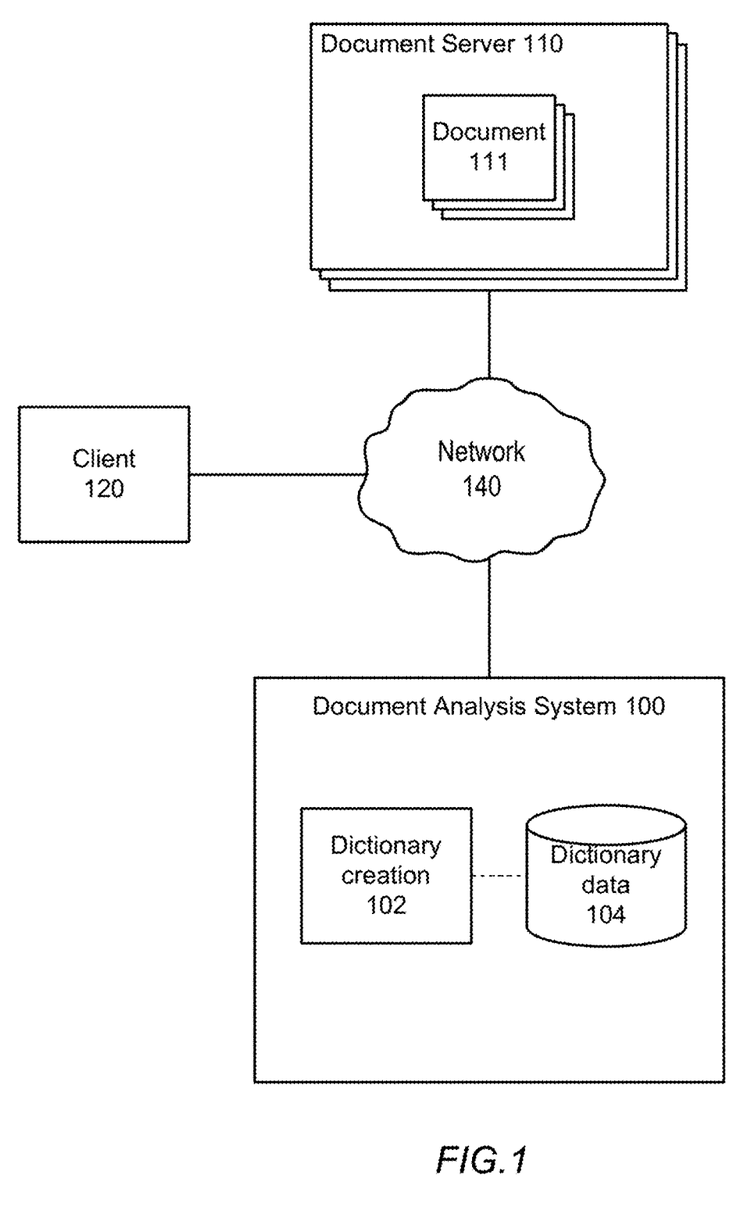
FIG. 1 illustrates a computing environment in which specialized dictionary creation takes place, according to one embodiment.

FIG. 1 illustrates a computing environment in which specialized dictionary creation takes place, according to one embodiment. A document analysis system 100 analyzes electronic documents 111, such as those provided by various document servers 110 accessible via a network 140, and based on the analysis produces one or more specialized dictionaries defining specialized words present in the analyzed documents. The document analysis system 100 can then provide data from the specialized dictionaries to supplement other content provided by a content server (not illustrated) to a client 120.

The document servers 110 are computer systems, such as web servers, file servers, content management systems, and the like, that upon request provide copies of electronic documents 111 having textual components, such as web pages, pure text files, or multimedia files such as e-books. Communication between the document analysis system 100 and the document servers 110 may be accomplished via the network 140. The network 140 is typically the Internet, but may be any network, including but not limited to a LAN, a WAN, a mobile wired or wireless network, a cloud computing network, a private network, or a virtual private network.

The document analysis system 100 obtains documents to analyze from one or more of the document servers 110. In one embodiment, the document analysis system 100 alternatively and/or additionally obtains documents from other sources, such as document collections accessible locally, e.g., on local hard drives, compact discs, or other forms of local media. Regardless of how the documents are obtained, the document analysis system 100 uses a dictionary creation module 102 to analyze the documents and to create corresponding dictionary data 104 constituting one or more specialized dictionaries.

In one embodiment, the dictionary creation module 102 performs a number of different operations on the document 111 when creating the specialized dictionary, such as extracting phrases from the documents and scoring them based on different factors such as phrase frequency, phrase capitalization, and grammatical patterns. Other operations performed by the dictionary creation module 102 in some embodiments include phrase clustering, and selection of the phrases most representative of their clusters, and (for selected most representative phrases) extraction of the corresponding phrase definitions.

The dictionary data 104 can be provided to supplement other content provided by a content server, search engine, or the like to a client 120. For example, in the case of electronic books provided by a content server, the content server can look up definitions of specialized phrases in the electronic books within the dictionary data 104 and (for example) provide a user interface to the client 120 that shows the definitions in visual association with the words.

Figure 2:
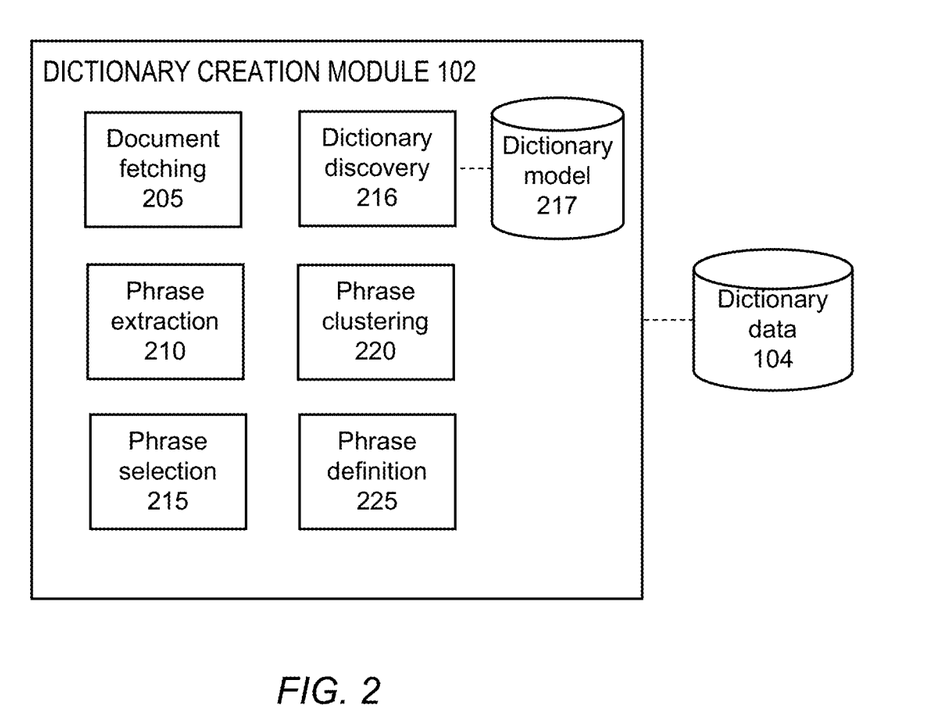
FIG. 2 is a high-level block diagram illustrating a detailed view of the document analysis system of FIG. 1, according to one embodiment.

FIG. 2 is a high-level block diagram illustrating a detailed view of the dictionary creation module 102, according to one embodiment. The dictionary creation module 102 comprises a document fetching module 205 that obtains documents from a corpus of documents to be processed, a phrase extraction module 210 that identifies phrases within the documents, a phrase selection module 215 that scores and ranks the identified phrases to identify initial candidate phrases for inclusion in a specialized dictionary, a dictionary discovery module 216 that determines whether given documents are dictionaries (and if so, of what type), a phrase clustering module 220 that groups the identified phrases into semantically similar clusters and selects phrases most representative of their clusters, and a phrase definition module 225 that identifies a definition for a given phrase within the document corpus. These components are now described in more detail.

The document fetching module 205 obtains a corpus of documents to be processed in order to create a specialized dictionary. In one embodiment, the corpus of documents to be processed is predetermined and constitutes (for example) a collection of digital books or other publications, a set of web pages, or other types of documents provided by the document servers 110, or a combination thereof. In other embodiments, the corpus is specified dynamically by a user at the beginning of the process of specialized dictionary creation, e.g., by providing the URL for one or more domains, a path to one or more directories on a local or network file system, a document query, or any other means of specifying a set of documents.

The document fetching module 205 obtains each document in such a corpus according to the protocols or other rules associated with that corpus. For example, where the corpus comprises web pages, the document fetching module 205 may have a web crawler component that makes HTTP requests to obtain the pages, analyzes the links in the pages, and obtains the other pages corresponding to those links. The documents obtained by the document fetching module 205 are then processed by the other components of the dictionary creation module 102.

The phrase extraction module 210 identifies phrases within the corpus obtained by the document fetching module 205. Specifically, the phrase extraction module 210 extracts word n-grams, i.e., strings of up to 'n' ordered word tokens. For example, for the sentence "It was the best of times," and where n is 2, the phrase extraction module 210 would extract the unigrams "It," "was," "the," "best," "of," "times," and the bi-grams "It was," "was the," "the best," "best of," and "of times." These n-grams constitute the phrases that are further analyzed by other components of the dictionary creation module 102.

In one embodiment, the phrase extraction module 210 creates, for each identified phrase, a list of occurrences of the phrase, including (for each occurrence) an identifier of the document in which the phrase occurred and an indication of the position of the phrase within that document. This list is then accessed by other components of the dictionary creation module 102 when performing additional analysis of the phrases.

The phrase selection module 215 scores and ranks the identified phrases to identify the candidate phrases for further processing and possible inclusion in the specialized dictionary. The phrase selection module 215 may use a combination of factors to determine a combined selection score for a given phrase. For example, in one embodiment the phrase selection module 215 determines a sub-score corresponding to each of the following factors, although it is appreciated that other factors may be employed in other embodiments.

(A) Frequency: In one embodiment the phrase selection module 215 assigns a frequency sub-score to a phrase based in part on a frequency with which the phrase occurs in the corpus, with greater frequencies of occurrence of a given phrase in the corpus leading to lower frequency sub-scores for the phrase. The frequency can be measured as the total number of occurrences in the document corpus, i.e., the sum of the number of occurrences in each of the documents. In another embodiment, the phrase selection module 215 assigns a selection score to a phrase based in part on a term-frequency/inverse document frequency (TF-IDF) score. The TF-IDF score results from dividing the frequency of a given phrase in a given document by the frequency of the phrase in the corpus as a whole, and indicates how important the phrase is to the documents in which it occurs. For example, for each phrase, a TF-IDF score can be computed for each document in which the phrase occurs, and then averaged based on the number of documents in which the phrase occurs. These sub-scores reflect that the less frequent a particular phrase, the less likely it is to be a common word already defined by conventional dictionaries, and therefore the more likely to warrant an entry in a specialized dictionary.

(B) Grammatical structure: In one embodiment the phrase selection module 215 assigns a grammatical structure sub-score to a phrase based in part on a confidence that the given phrase has a corresponding definition. To determine whether the phrase has a corresponding definition, the phrase selection module 215 analyzes the text including and adjacent to the various occurrences in corpus documents of the phrase in the phrase list created by the phrase extraction module 210, determining whether the phrase is part of a linguistic pattern indicating a possible definition, such as hyponym (e.g., "car is a vehicle", defining "car" as a member of the class "vehicle") or an apposition (e.g., "Alice's cat Dinah", defining the proper name "Dinah" as "Alice's cat"). This grammatical structure sub-score is proportional to a confidence that the given phrase has a corresponding definition, e.g., is part of a hyponym or apposition, with higher confidences leading to greater sub-scores. The computation of the grammatical structure sub-score reflects the intuition that phrases with corresponding definitions are very positive candidates for dictionary entries.

(C) Capitalization: In one embodiment the phrase selection module 215 assigns a capitalization sub-score to a phrase based in part on capitalization of occurrences of the phrase. In many languages, such as English, typically only proper names, or the first word in a sentence, are capitalized. In one embodiment, each phrase's various occurrences are analyzed to identify the instances in which they occur in capitalized form; if they sometimes appear capitalized after the first word in a sentence, and sometimes not, their capitalization sub-score is slightly increased on the assumption that such ambiguous words will be worthwhile to define. In contrast, if the phrases appear capitalized only as the first word of a sentence, their capitalization sub-scores are slightly decreased, and if the phrases appear consistently capitalized (i.e., a proper name), then their capitalization sub-scores are slightly increased on the assumption that proper names are unlikely to be in a conventional dictionary.

(D) Part of speech: In one embodiment the phrase selection module 215 determines a part of speech represented by a given phrase (e.g., using a hidden Markov model) and assigns a part of speech sub-score to the phrase based in part on the determined part of speech. For example, nouns are assigned higher part of speech sub-scores, in that they are likely to be meaningful concepts to define. In contrast, prepositions are assigned very low sub-scores, in that they are highly likely to be commonplace terms already defined by conventional dictionary.

(E) Presence in existing dictionaries: In one embodiment the phrase selection module 215 assigns a dictionary-presence sub-score to the phrase based in part on the extent that the phrase (or a stemmed version thereof) is present in a document believed to represent a dictionary of conventional terms. Specifically, the phrase selection module 215 identifies a stemmed form of the phrase representing a canonical base concept (e.g., the stem "cat" for the phrase "cats" or "catty") and determines whether the stem is already present in the document. If the stem is already present, the phrase is assigned a low dictionary-presence sub-score, since there is little value in creating a dictionary entry for a conventional term already defined elsewhere; conversely, to the extent that the phrase is present in a document believed to represent a dictionary of specialized terms (e.g., terms specific to particular works of literature), the phrase is assigned a high dictionary-presence sub-score.

In this embodiment, the dictionary discovery module 216 first analyzes some or all of the documents in the document corpus to identify the documents that appear to be conventional or specialized dictionaries. Specifically, the dictionary discovery module 216 has a dictionary model 217 which it applies to each document to be analyzed. The dictionary model 217, when applied to a document, outputs a dictionary-match score indicating a degree of confidence that the document is a dictionary; if the degree of confidence is at least at a predetermined threshold level, then the document is determined to be a dictionary. The model 217 may have an associated template (or consist of a template), the template allowing the dictionary discovery module 216 to parse out the phrases representing the terms defined by the documents determined to be dictionaries. The dictionary discovery module 216 then determines frequencies of these terms in the document corpus, and if they are sufficiently frequent, determines that the document is a conventional dictionary; conversely, if they are sufficiently infrequent, the dictionary discovery module 216 determines that the document is a specialized dictionary.

In one embodiment, the dictionary models are manually-created templates based on formatting properties such as the number of columns on a page, the average number of paragraphs on a page, the average number of lines per paragraph, whether the first words in a paragraph are formatted differently from other words in the paragraph, and the like.

In another embodiment, the dictionary models are trained using supervised machine learning techniques, where the features on which the models are trained are the extracted formatting properties, and where the positive training set is the set of documents manually determined to represent dictionaries, for example. As one example, the dictionary model 217 can be trained by first obtaining the positive training set by querying a book or other document repository for documents likely to be dictionaries, e.g., those with the term "dictionary" in their title. The documents of the training set can then be converted to text using optical character recognition (OCR). The low-frequency phrases can be considered candidate dictionary phrases to be defined, and their positions on the page noted. The dictionary model 217 can then be trained using this position information from the documents of the training set. Then, for a document of unknown type, the dictionary discovery module 216 can apply OCR, determine the positions of the low-frequency phrases, and apply the dictionary model 217 to the determined positions to estimate the probability that the unknown document is a dictionary.

With the various sub-scores computed, the phrase selection module 215 combines the sub-scores into the combined selection score. In one embodiment, this combination is accomplished with a weighted average, e.g., by applying a corresponding weight to each sub-score and summing the results. In one embodiment, the weights to apply are first learned using machine learning techniques, such as a regression support vector machine, in which the inputs are various documents 111 and their corresponding known labels (i.e., "dictionary" or "not dictionary") and various sub-scores according to the sub-scores above, and the outputs are the weights to apply to each of the sub-scores. The weights may additionally be manually adjusted, even if they are initially learned using machine learning techniques.

The phrase selection module 215 selects, as candidates for further processing (and possible inclusion into a specialized dictionary), some set of the highest-scoring phrases identified by the phrase selection module 215, such as the top N documents for some integer N, or all documents with scores greater than a certain threshold, or the like.

The phrase clustering module 220 groups the phrases identified by the phrase extraction module 210 and selected by the phrase selection module 215 into semantically similar clusters and selects the phrases that are most representative of their clusters.

In one embodiment, the phrase clustering module 220 employs a centroid-based clustering algorithm, such as k-means clustering, which clusters the phrases based on their degree of similarity (equivalently, distance) to each other, forming clusters of comparatively similar phrases. In this embodiment, the degree of similarity of two phrases is a function of various different factors, such as their degree of co-occurrence, the similarity of their concepts, and their capitalization, as discussed below.

(A) Co-occurrence: In one embodiment, the phrase clustering module 220 computes the co-occurrence sub-score of two phrases as the percentage of documents in the corpus in which the phrases both occur. The phrase clustering module 220 can quickly identify the documents in which the phrases occur by consulting the phrase occurrence list generated by the phrase extraction module 210 and then determining the co-occurrence documents as the union of the documents of occurrence for each phrase.

(B) Concept similarity: In one embodiment, the phrase clustering module 220 computes a concept similarity sub-score quantifying how similar the concepts represented by a given pair of phrases are. For example, the phrase clustering module 220 might determine that the concepts represented by the phrases "knife" and "fork" have a concept similarity sub-score of 0.95 on a scale of 0 to 1 (given that both represent utensils used in eating), whereas the phrases "penguin" and "Victorian literature" have a concept similarity sub-score of 0.03 (given that one represents an animal and the other represents an abstraction in the field of literature). In one embodiment, the phrase clustering module 220 computes the concept similarity sub-score by determining a graph distance (i.e., number of edges) between the two phrases in an existing ontology graph.

(C) Capitalization: Phrases that typically have the same capitalization (e.g., are almost always, or almost never, capitalized) tend to have a certain degree of relationship. For example, in many languages, phrases that are almost always capitalized typically represent proper names, which is a significant similarity. Thus, in one embodiment the phrase clustering module 220 bases the capitalization sub-score of two phrases on the difference between the capitalization frequencies of the two terms, e.g., the 1's complement of the difference. For example, a pair of phrases that are respectively capitalized in 97% and 99% of their occurrences have a capitalization frequency difference of 0.02, and hence a capitalization sub-score of 1−0.02=0.98.

In one embodiment, the phrase clustering module 220 sets the combined similarity to be the weighted average of the various similarity sub-scores employed, e.g., the co-occurrence, concept similarity, and capitalization sub-scores described above. In one embodiment, machine learning techniques such as regression support vector machines are employed as described above with respect to the phrase selection module 215 to determine the optimal weights to assign to the different similarity sub-scores when computing the aggregate similarity.

Using the aggregate similarity score as the similarity function, the phrase clustering module applies the clustering algorithm (e.g., k-means clustering) to cluster the phrases into groups. Specifically, pairs of phrases are compared using the similarity function, and those pairs that are sufficiently close to one another are partitioned into the same cluster. To determine whether a phrase belongs within a given phrase cluster, it is compared with any phrase from that cluster.

In one embodiment, having clustered the phrases, the phrase clustering module 220 further selects, as the phrases to include in a specialized dictionary, a set of phrases that are most representative of their clusters. Specifically, for each cluster C, the phrase clustering module 220 identifies the set of documents D in which any phrase in the cluster occurs. The phrase clustering module 220 then identifies, for each phrase P in the cluster C, the documents $d_i$ from D in which P occurs, and sets an occurrence score for P to be the ratio of the number of documents $d_i$ to the number of documents in D (i.e., $\#d_i/\#D$). The phrase clustering module 220 then selects, as its output, a representative set of the phrases that have the highest occurrence scores and hence are expected to best represent the phrases in their particular clusters and therefore be most valuable to include in a specialized dictionary. In one embodiment, the phrase clustering module 220 selects the top N phrases with the highest scores, for some integer N, regardless of the cluster. Thus, some clusters might have several phrases selected, and others might have no phrases selected.

Given the set of representative phrases identified by the phrase clustering module 220, the phrase definition module 225 identifies a definition for a given phrase within the document corpus. To do so, the phrase definition module 225 first scores and ranks, for each phrase, the various specific occurrences of that phrase in the documents of the corpus according to their corresponding suitability scores (described below). This can efficiently be accomplished by iterating through the various phrase occurrences using the phrase occurrence list produced by the phrase identification module 210. The phrase definition module 225 then attempts to extract a definition from the top ranking occurrences as defined by the suitability scores.

Preparatory to extracting phrase definitions, the phrase definition module 225 generates suitability scores quantifying the suitability of the various occurrences of the phrase in the documents of the corpus for obtaining a definition, based on a number of sub-scores. For example, in one embodiment the sub-scores include the following.

(A) Position: In one embodiment, the phrase clustering module 220 assigns a position sub-score to a phrase occurrence as a function of its position from the start of the document. Specifically, the earlier of a given occurrence of a phrase in a document, the greater its position sub-score, on the assumption that phrases tend to be defined near the beginning of the document, rather than later on. In one embodiment, the character position within the document of the occurrence is determined and mapped to a percentage into the document (e.g., after first 1% of characters but within first 2% of characters=1%=0.01) and the position score is set to the 1's complement of the character position (e.g., 1.0−0.01=0.99).

(B) Document age: In one embodiment, the phrase clustering module 220 assigns an age sub-score to a phrase occurrence as a function of the age of the document in which it occurs. Specifically, the older the document in which the phrase occurs, the greater its age sub-score, on the assumption that phrases tend to be defined more frequently when they first were introduced than later on, when their meanings have become more well known. In one embodiment, for each phrase, the ages of all documents in which that phrase occurs are determined, the ages are sorted, and the age sub-score for a given phrase occurrence is assigned corresponding to its percentile within the sorted ages. E.g., for an occurrence that is the second-oldest of 100 documents in which the phrase occurs the age sub-score is 0.99 (i.e., in the second percentile in terms of age).

(C) Grammatical pattern: In one embodiment, the phrase clustering module 220 assigns a grammatical pattern sub-score to a phrase occurrence as a function of whether (or how well) the phrase occurrence and its surrounding text match a grammatical pattern, such as an appositional pattern or a Hearst pattern used to recognize hyponyms.

As described above, regression support Evector machines or other machine learning techniques may be employed to determine the optimal weightings for the different sub-scores.

The phrase definition module 225 ranks the different occurrences of the various phrases according to their suitability scores and attempts, for each phrase, to extract a definition from the highest-ranking occurrences of that phrase, including the text surrounding those phrases. For example, the phrase definition module 225 might extract definitions from the highest-ranking occurrences that matched the tested grammatical patterns (e.g., appositional patterns or Hearst patterns), taking as the definition the portion of the document text that matched the definition portion of the pattern.

As a simple example, assume that the phrase is "Quidditch," that the text range "Quidditch is a fictional competitive sport in the wizarding world" corresponds to one of the highest-ranking occurrences of the phrase ("Quidditch") along with its surrounding text ("is a fictional competitive sport in the wizarding world), and that one of the Hearst patterns employed to match hyponyms is the pattern "X is a Y," where X is the concept to be defined and Y is the definition. In this example, "Quidditch" and "fictional competitive sport in the wizarding world" respectively match the X and Y components in the Hearst pattern ("X is a Y"). Hence, the definition (or, in some embodiments, one of several possible definitions) for "Quidditch" is selected to be "fictional competitive sport in the wizarding world."

The phrase definition module stores the extracted phrases and their corresponding definitions in the dictionary data 104 for future use, such as for providing definitions for specialized phrases in electronic books presented to a client 120.

Figure 3:
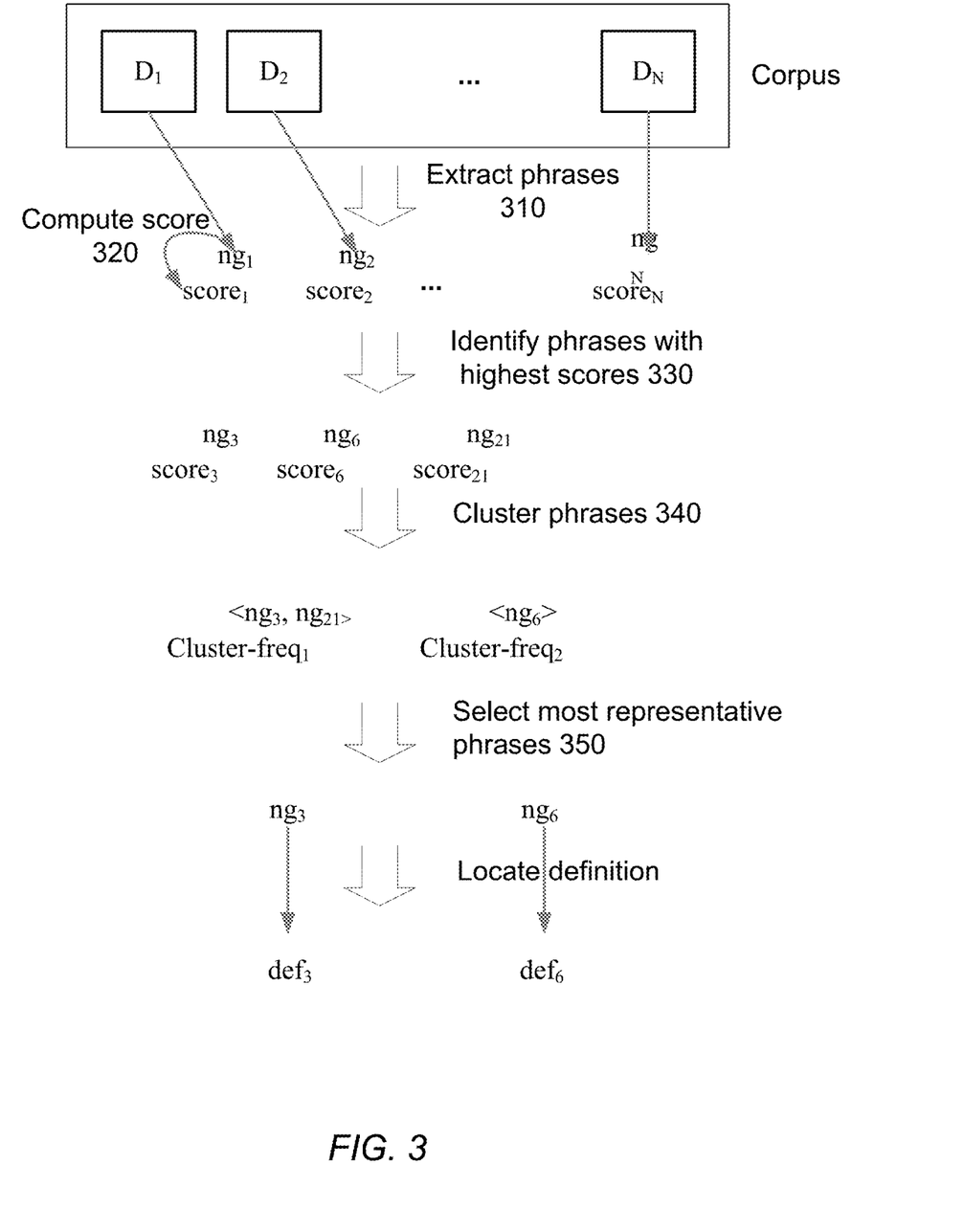
FIG. 3 is a data flow diagram illustrating the data analysis and processing performed by the dictionary creation module of FIGS. 1 and 2, according to one embodiment.

FIG. 3 is a data flow diagram illustrating the data analysis and processing performed by the dictionary creation module 102, according to one embodiment.

Initially, phrases are extracted 310 from the documents 111 that make up the corpus to be analyzed, as described above with respect to the phrase extraction module 210. A selection score is also computed 320 for each phrase (e.g., based on factors such as phrase occurrence frequency, phrase grammatical patterns, phrase part of speech, and presence of the phrase within documents representing dictionaries), and the phrases with the highest selection scores are identified 330 for further processing, as described above with respect to the phrase selection module 215.

The identified phrases are clustered 340 into a number of different clusters of semantically similar phrases, as described above with respect to the phrase clustering module 220. The clustering is performed according to a measure of phrase similarity, which in different embodiments is evaluated according to factors such as co-occurrence of phrases, similarity of phrase concepts, and phrase capitalization. A set of phrases most representative of their respective concepts is further selected 350 by determining how frequently the various phrases in a cluster occur in the documents associated with the cluster.

A definition is then extracted, if possible, for each of the phrases determined to be most representative of their respective concepts, as described above with respect to the phrase definition module 225. Specifically, the various occurrences of each of the phrases are assigned suitability scores quantifying the suitability of the various occurrences of the phrase in the documents of the corpus for obtaining a definition, e.g., based on factors such as location of the phrase occurrence in a document, age of the document in which the phrase occurs, and/or how well the corresponding document portion matches a grammatical pattern such as an appositional pattern or Hearst pattern. For at least one of the occurrences that are determined to likely contain a definition, a definition for the corresponding phrase is extracted using one of the grammatical patterns that matched, and the phrase and its definition are stored in association with in the dictionary data 104.

The dictionary data 104 generated by the dictionary creation module 102 can be applied to supplement information presented by other systems, providing definitions of phrases occurring in the content presented by those systems. As one example, a website or application for reading electronic versions of books or other periodicals could use the phrases and their corresponding definitions from the dictionary data 104 to allow users to quickly define specialized terms in the books. For example, the word "quidditch" in the electronic book could be visually emphasized, and interacting with it (e.g., hovering the mouse cursor over it) could lead to display of the definition(s) within the user interface.

As another example, a search engine could apply the dictionary data 104 to supplement the search results provided in response to a search query. For example, if the search results for a particular query frequently involved "Quidditch," a fictional game from a particular book series, the search engine could look up the definition of Quidditch in the dictionary data 104, and displaying a sidebar or other user interface area of the search results page could contain an entry defining Quidditch (e.g., "Quidditch is a fictional competitive sport in the wizarding world"), along with associated information such as links to web sites related to Quidditch.

Figure 4:
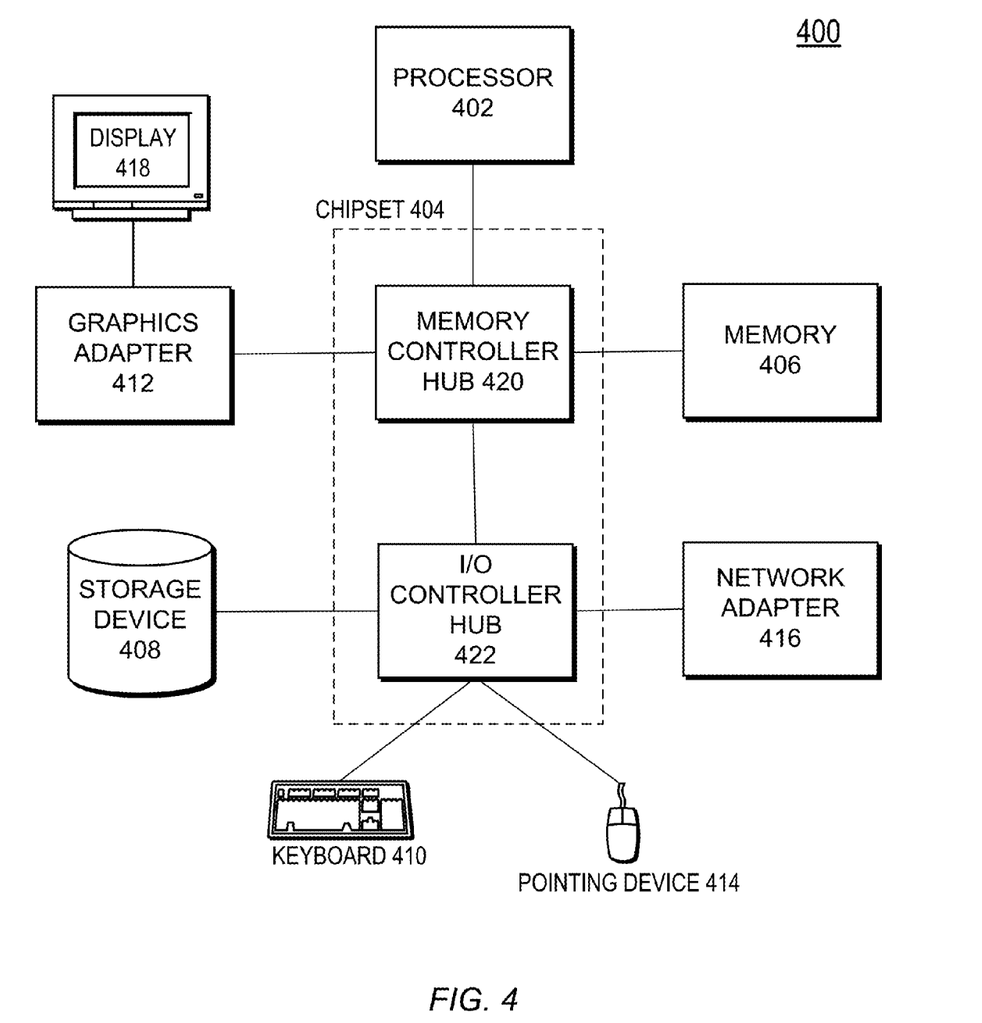
FIG. 4 is a high-level block diagram illustrating physical components of a computer used as apart or all of the document server and/or the document analysis system from FIG. 1, according to one embodiment.

FIG. 4 is a high-level block diagram illustrating physical components of a computer 400 used as part or all of the document server 110 and/or the document analysis system 100 from FIG. 1, according to one embodiment. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer 400. The graphics adapter 412 displays images and other information on the display 418. The network adapter 416 couples the computer system 400 to a local or wide area network.

As is known in the art, a computer 400 can have different and/or other components than those shown in FIG. 4. In addition, the computer 400 can lack certain illustrated components. In one embodiment, a computer 400 acting as a server may lack a keyboard 410, pointing device 414, graphics adapter 412, and/or display 418. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for automatically generating a specialized dictionary, comprising:
    extracting a plurality of potential phrases from a document corpus including a plurality of documents;
    assigning each of the plurality of potential phrases to a cluster from a plurality of clusters;
    identifying, for each of the plurality of clusters, a set of documents from the plurality of documents that include at least one potential phrase assigned to the cluster;
    determining, for each of the plurality of potential phrases, a score based on a number of documents that include the potential phrase from the set of documents identified for the cluster to which the potential phrase is assigned;
    selecting, from the plurality of potential phrases, potential phrases as dictionary phrases, each dictionary phrase selected based on the score determined for the dictionary phrase;
    extracting, for each dictionary phrase, a definition from the document corpus; and
    storing each dictionary phrase and the definition extracted for the dictionary phrase.

2. The computer-implemented method of claim 1, further comprising extracting each of the plurality of the potential phrases based on whether the potential phrase is part of a linguistic pattern indicating a definition of the potential phrase.

3. The computer-implemented method of claim 1, further comprising extracting each of the plurality of the potential phrases based on capitalization of the potential phrase.

4. The computer-implemented method of claim 1, further comprising extracting each of the plurality of the potential phrases based on parts of speech of the potential phrases.

5. The computer-implemented method of claim 1, wherein assigning each of the plurality of potential phrases to a cluster phrase clusters comprises determining co-occurrences of potential phrases from the plurality of potential phrases.

6. The computer-implemented method of claim 1, wherein assigning each of the plurality of potential phrases to a cluster comprises at least one of: determining similarity of concepts represented by the plurality of potential phrases, and determining capitalization of the plurality of potential phrases.

7. The computer-implemented method of claim 1, wherein assigning each of the plurality of potential phrases to a cluster comprises determining co-occurrences of a pair of potential phrases from the plurality of potential phrases within the document corpus and determining similarity of concepts represented by the pair of potential phrases, the method further comprising:
forming a similarity measure between the pair of potential phrases using the determined co-occurrences and the determined similarity of concepts; and
applying machine learning to determine values by which to weight the determined co-occurrences and the determined similarity of concepts in order to produce the similarity measure.

8. The computer-implemented method of claim 1, further comprising determining whether a first document in the document corpus is a dictionary, wherein assigning each of the plurality of potential phrases to a cluster comprises determining whether the potential phrase is present in the first document.

9. The computer-implemented method of claim 8, wherein determining whether the first document is a dictionary comprises applying a dictionary model template to the first document, the dictionary model template specifying a plurality of formatting properties of documents characteristic of dictionaries.

10. The computer-implemented method of claim 1, wherein selecting potential phrases as dictionary phrases comprises identifying positions of occurrences of the dictionary phrases within the plurality of documents.

11. A tangible computer-readable storage medium storing instructions that when executed by a processor cause the processor to perform steps comprising:
extracting a plurality of potential phrases from a document corpus including a plurality of documents;
assigning each of the plurality of potential phrases into a to a cluster from a plurality of clusters;
identifying, for each of the plurality of clusters, a set of documents from the plurality of documents that include at least one potential phrase assigned to the cluster;
determining, for each of the plurality of potential phrases, a score based on a number of documents that include the potential phrase from the set of documents identified for the cluster to which the potential phrase is assigned;
selecting, from the plurality of potential phrases, potential phrases as dictionary phrases, each dictionary phrase selected based on the score determined for the dictionary phrase;
extracting, for each dictionary phrase, a definition from the document corpus; and
storing each dictionary phrase and the definition extracted for the selected dictionary phrase.

12. The computer-readable storage medium of claim 11, wherein extracting the plurality of the potential phrases comprises identifying ages of documents of the document corpus in which the plurality of the potential phrases occur.

13. The computer-readable storage medium of claim 11, wherein extracting the definition for a dictionary phrase comprises determining whether the dictionary phrase is part of a linguistic pattern indicating the definition of the dictionary phrase.

14. The computer-readable storage medium of claim 11, wherein the instructions further cause the processor to perform steps comprising:
receiving a request to define a phrase associated with an electronic book;
identifying the requested phrase within the dictionary phrases stored; and
providing the stored definition associated with the requested phrase.

15. The computer-readable storage medium of claim 11, wherein assigning each of the plurality of potential phrases to a cluster comprises determining co-occurrences of a pair of potential phrases from the plurality of potential phrases within the document corpus and determining similarity of concepts represented by the pair of potential phrases, the method further comprising:
forming a similarity measure between the pair of potential phrases using the determined co-occurrences and the determined similarity of concepts; and
applying machine learning to determine values by which to weight the determined co-occurrences and the determined similarity of concepts in order to produce the similarity measure.

16. The computer-readable storage medium of claim 11, further comprising extracting each of the plurality of the potential phrases based on whether the potential phrase is part of a linguistic pattern indicating a definition of the potential phrase.

17. A computing device comprising:
a computer processor; and
a tangible computer-readable storage medium storing instructions executed by the computer processor to perform steps comprising:
extracting a plurality of potential phrases from a document corpus including a plurality of documents;
assigning each of the plurality of potential phrases to a cluster from a plurality of clusters;
identifying, for each of the plurality of clusters, a set of documents from the plurality of documents that include at least one potential phrase assigned to the cluster;
determining, for each of the plurality of potential phrases, a score based on a number of documents that include the potential phrase from the set of documents identified for the cluster to which the potential phrase is assigned;
selecting, from the plurality of potential phrases, potential phrases as dictionary phrases, each dictionary phrase selected based on the score determined for the dictionary phrase;
extracting, for each dictionary phrase, a definition from the document corpus; and
storing each dictionary phrase and the definition extracted for the selected dictionary phrase.

18. The computing device of claim 17, wherein extracting the plurality of the potential phrases comprises identifying ages of documents of the document corpus in which the plurality of the potential phrases occur.

19. The computing device of claim 17, wherein extracting the definition for a dictionary phrase comprises determining whether the dictionary phrase is part of a linguistic pattern indicating the definition of the dictionary phrase.

20. A system comprising:
- means for extracting a plurality of potential phrases from a document corpus including a plurality of documents;
- means for assigning each of the plurality of potential phrases into a to a cluster from a plurality of clusters;
- means for identifying, for each of the plurality of clusters, a set of documents from the plurality of documents that include at least one potential phrase assigned to the cluster;
- means for determining, for each of the plurality of potential phrases, a score based on a number of documents that include the potential phrase from the set of documents identified for the cluster to which the potential phrase is assigned;
- means for selecting, from the plurality of potential phrases, potential phrases as dictionary phrases, each dictionary phrase selected based on the score determined for the dictionary phrase;
- means for extracting, for each dictionary phrase, a definition from the document corpus; and
- means for storing each dictionary phrase and the definition extracted for the selected dictionary phrase.

* * * * *